Figure 1:
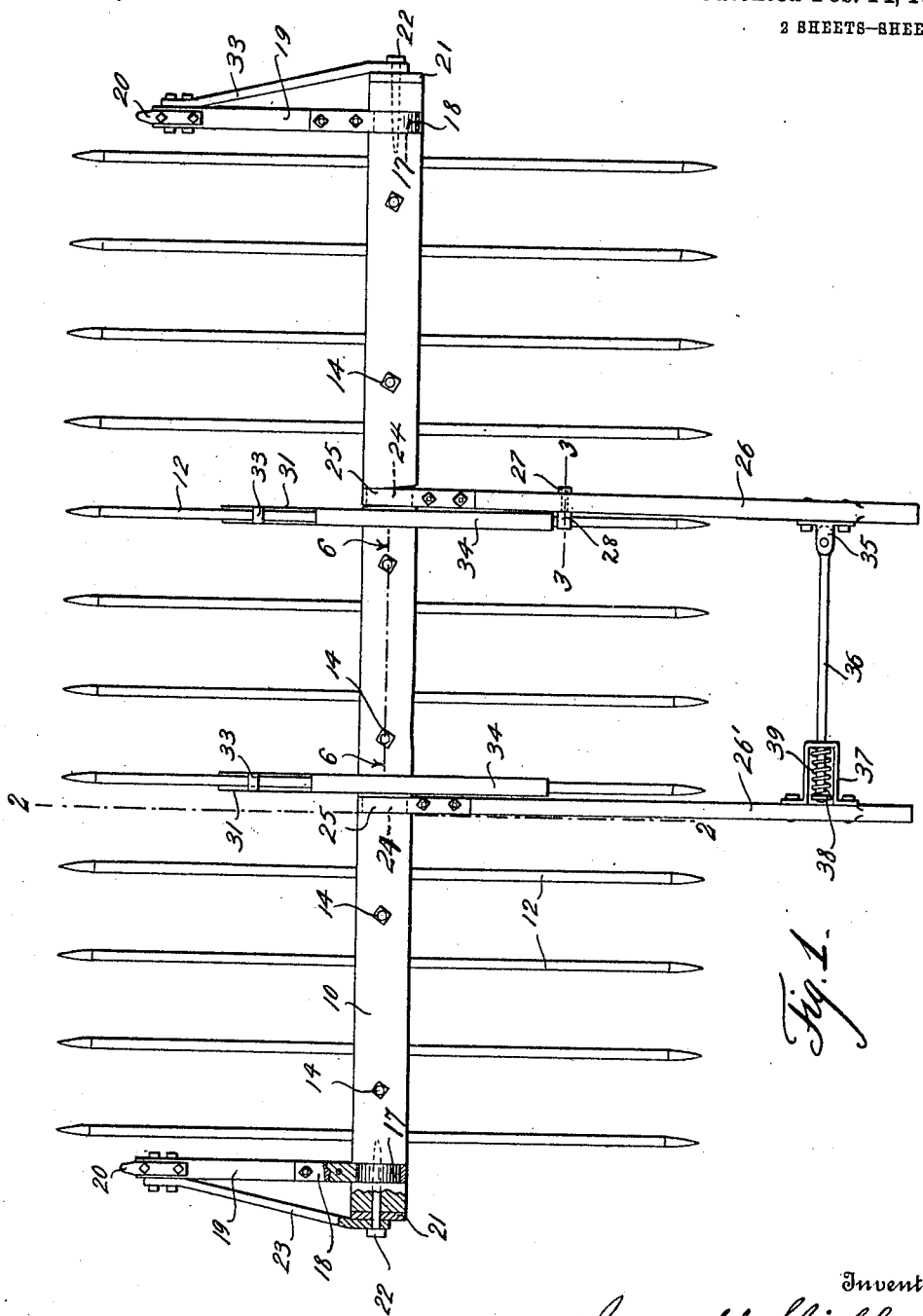

I. SKJELDRUP.
TILTING RAKE.
APPLICATION FILED JUNE 27, 1910.

984,399.

Patented Feb. 14, 1911.
2 SHEETS—SHEET 1.

Witnesses
E. Larson
Charles A. Wilson

Inventor
Ingvald Skjeldrup
By Deelert Robb
Attorneys

I. SKJELDRUP.
TILTING RAKE.
APPLICATION FILED JUNE 27, 1910.
984,399.
Patented Feb. 14, 1911.
2 SHEETS—SHEET 2.
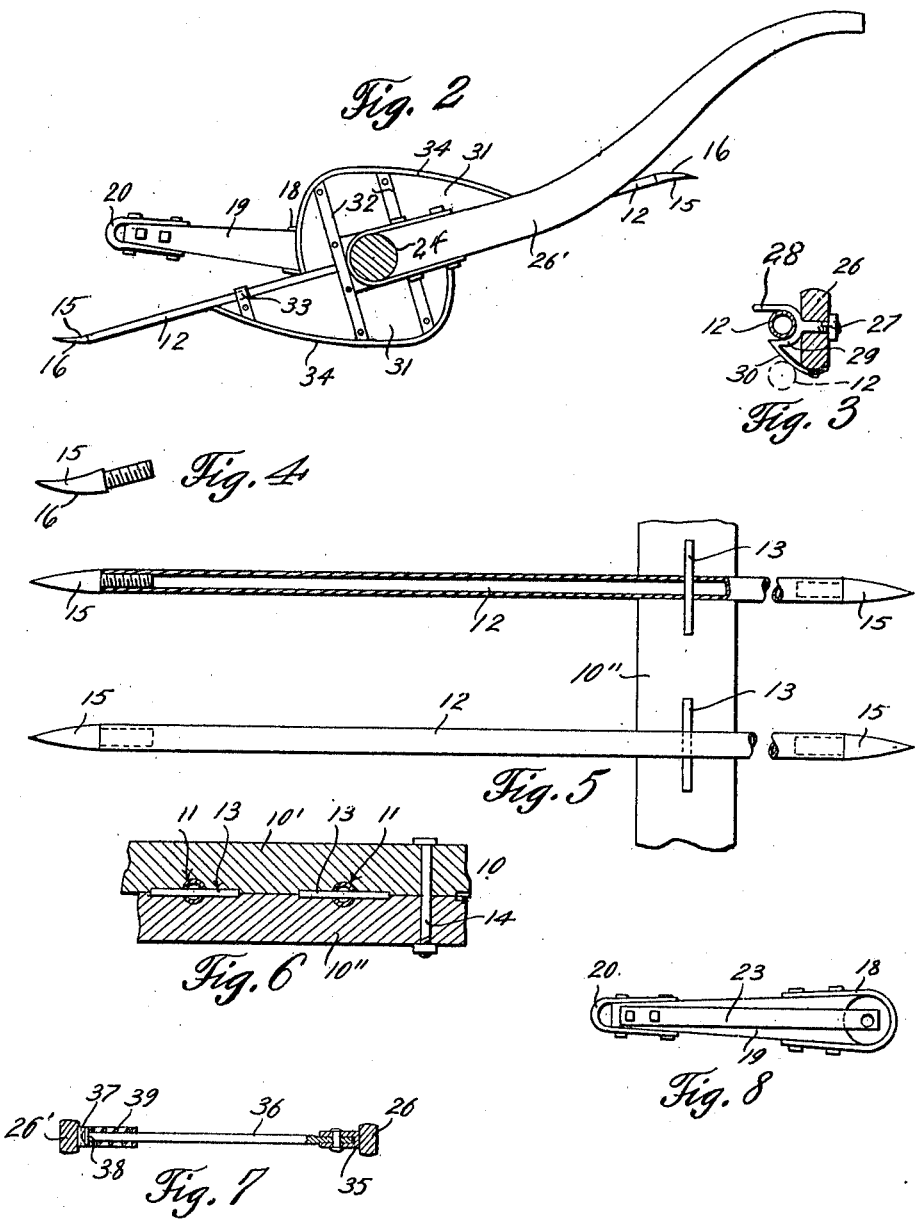

UNITED STATES PATENT OFFICE.

INGVALD SKJELDRUP, OF FERGUS FALLS, MINNESOTA.

TILTING RAKE.

984,399.   Specification of Letters Patent.   Patented Feb. 14, 1911.

Application filed June 27, 1910. Serial No. 569,214.

*To all whom it may concern:*

Be it known that I, INGVALD SKJELDRUP, a subject of the King of Norway, residing at Fergus Falls, in the county of Ottertail and State of Minnesota, have invented certain new and useful Improvements in Tilting Rakes, of which the following is a specification.

This invention relates to rakes and particularly that type of rakes known as push rakes.

It is designed to construct a rake of this nature which will be durable, inexpensive, and cheap to manufacture.

It also contemplates the construction of a rake, wherein should the points of the teeth become broken, the same may be removed and new ones substituted therefor.

With the above and other objects in view, this invention consists in the construction, combination, and arrangement of parts, all as hereinafter more fully described, claimed, and illustrated in the accompanying drawings, wherein—

Figure 1 is a top plan view of a rake constructed in accordance with the present invention, parts thereof being broken away; Fig. 2 is a section taken along the line 2—2 of Fig. 1; Fig. 3 is a detail section taken along the line 3—3 of Fig. 1; Fig. 4 is a side elevation of one of the detachable tine points; Fig. 5 is a top plan view partly in section of the lower section of the main beam; Fig. 6 is a section taken along the line 6—6 of Fig. 1; Fig. 7 is an elevation partly in section of the connection between the handles; Fig. 8 is an end elevation of the draft gear.

In carrying out the present invention a main beam or bar 10 is provided constructed in two sections 10′ and 10″, each section being provided with a series of transverse grooves 11 which, when the sections are in their operative positions form circular openings in which the central part of the tubular body portions 12 of the tines are received. Each tine is provided with a transverse pin or rod 13 which is adapted to normally rest between the sections 10′ and 10″ and retain the tines from longitudinal or torsional movement. The sections 10′ and 10″ are secured together by a series of bolts 14 which pierce both sections and securely clamp the tines between said sections and cause the sections to present a substantially solid beam or bar 10.

The tubular body portions of the tines have removably mounted in each extremity thereof a point 15, the oppositely disposed point of each tine 12 being provided with the beveled portion 16 on opposite sides. From this construction it will be readily seen that as the bar 10 is turned an operating surface extending in the proper direction is provided.

Adjacent to each terminal of the bar 10 is a circular portion 17 about which extends a strap 18, said strap securing a draft bar 19 to the bar 10. The draft bars 19 are provided at their outer terminals with the eyes 20 to which may be secured the means whereby the rake is drawn. A plate 21 is mounted at each terminal of the bar 10 and is pierced by the pin 22, said pin having loosely mounted thereon the brace 23 which extends to the terminal of the draft bar 19 and is secured rigidly thereto, thereby adapted to remain stationary as the bar 10 and the tines 12 swing.

On each side of the center of the bar 10 are located the similar circular portions 24, each circular portion being adjacent to a tine. Each circular portion has loosely mounted thereon the bands 25 to which are securely fastened the levers 26 and 26′, the lever 26 being adapted to tilt the rake, while the lever 26′ is adapted to move said rake rearwardly when it is so desired. The lever 26 is pierced by a bolt 27, the terminal of which adjacent to one of the tines 12 being forked in order that said handle may operate with said tine. This forked portion comprises a horizontal elongated upper member 28 which is adapted to rest over the tine and the shortened lower member 29 which has the oblique spring 30 formed at the terminal thereof, thereby insuring the engagement of the tine by the forked member. There is sufficient room provided adjacent to the strap 25 carrying the lever 26 to permit said lever to be swung to the right and release the tine 12 which is engaged by the forked member carried by the bolt 27.

A plurality of runners are provided on the tines 12 adjacent to the levers 26 and 26′ on both sides thereof so that a runner will be in engagement with the ground at all times when in a raking position. One of these runners 31 is located on each side of the beam 10 adjacent to each tine 12 coöperating with the levers 26 and 26′, the inner terminals of the upper and lower runners being overlapping and connected together by the straps 32 on each side thereof, said straps arranged on each side of the beam 10. The outer terminals of the runners 31 are secured to the tines 12 by the straps 33 arranged to clamp the runner securely to the tines. Each runner is provided with a metal strip 34 on the bearing edge thereof. Each pair of runners may be constructed from a single block of wood which is somewhat elliptical in formation, one end thereof being enlarged, said block being split, one-half thereof forming a runner.

In operation the device travels on the runners 31 so that the curved portions 16 of the teeth 15 of the tines 12 operate on the ground, the hay or the like being collected on the forward half of the tines. When it is desired to dump the hay by tilting the rake the lever 26 is pulled upwardly and due to its connection with one of the tines 12 receive the rear portion of the rake, causing the teeth of the forward portion to bite into the ground. The lever is then moved to the right, releasing the tine engaged by the forked member carried by a bolt 27 permitting the rake to tilt or swing freely. After the tilt is completed and the hay dumped, the opposite terminals of the tines will accumulate the hay, while the original terminals of one of said tines is engaged by the forked member carried by the bolt 27.

In order to retain the lever 26' in an elevated position above the ground and yet permit the lever 26 to be moved to the right, a bracket 35 is carried on the inner face of the lever 26 and has pivotally connected thereto a rod 36, said rod adapted to reciprocate at its free terminal in the bracket 37 carried by the lever 26'. The rod 36 is provided with a head 38 which forms a bearing for the spring 39 interposed between the outer portion of the bracket 37 and said head. Thus it will be seen that the spring normally holds the forked member carried by the bolt 27 into engagement with the tine 12 adjacent thereto and the rod 36 retains the lever 26 from dragging on the ground.

Having thus fully described my invention, what is claimed as new is:

1. In a device of the class described, the combination with a main beam, of tines secured to and projecting on both sides of said beam, levers pivoted adjacent to a portion of said tines, one of said levers adapted to swing laterally, means on said laterally swinging lever to normally engage one of said tines, and a rod pivoted to said laterally moving lever and resiliently secured to the adjacent lever adapted to normally retain said lateral moving lever in normal engagement to one of said tines.

2. In a device of the class described, the combination with a main beam, of tines secured to and projecting on both sides of said beam, levers pivoted adjacent to a portion of said tines, one of said levers being adapted to swing laterally, means on said lateral moving lever to engage one of said tines, a bracket provided with an opening secured to one lever, a member passing through said opening and pivotally secured to the other of said levers, the free end of said member being provided with an enlarged head, and spring means interposed between said head and said bracket as set forth.

In testimony whereof I affix my signature in presence of two witnesses.

INGVALD SKJELDRUP.

Witnesses:
S. O. TUVE,
L. E. KLEPPE.